United States Patent [19]

Watanabe

[11] Patent Number: 5,649,241
[45] Date of Patent: Jul. 15, 1997

[54] AUTOFOCUS ADJUSTMENT DEVICE

[75] Inventor: Toshimi Watanabe, Kanagawa, Japan

[73] Assignee: Nikon Corporation, Tokyo, Japan

[21] Appl. No.: 496,666

[22] Filed: Jun. 29, 1995

[30] Foreign Application Priority Data

Sep. 7, 1994 [JP] Japan .................... 6-213408

[51] Int. Cl.$^6$ .................... G03B 7/08; G03B 3/00
[52] U.S. Cl. .................... 396/153; 396/95; 396/104
[58] Field of Search .................... 354/402, 430; 396/95, 104, 153, 154

[56] References Cited

U.S. PATENT DOCUMENTS

| | | |
|---|---|---|
| 5,061,951 | 10/1991 | Higashihara et al. . |
| 5,076,687 | 12/1991 | Adelson .................... 354/402 |
| 5,189,459 | 2/1993 | Watanabe et al. . |
| 5,208,625 | 5/1993 | Suekane .................... 354/402 |
| 5,239,332 | 8/1993 | Muramatsu et al. . |
| 5,262,820 | 11/1993 | Tamai et al. .................... 354/402 |

FOREIGN PATENT DOCUMENTS

| | | |
|---|---|---|
| 1-167815 | 7/1989 | Japan . |
| 1-285908 | 11/1989 | Japan . |

*Primary Examiner*—Russell E. Adams
*Assistant Examiner*—Michael Dalakis
*Attorney, Agent, or Firm*—Oliff & Berridge

[57] ABSTRACT

An autofocus adjustment device capable of computing the confidence level of focus detection accurately is disclosed. The autofocus adjustment device includes a focus detection device to determine focus detection results of the phototaking lens and a confidence value calculation device to calculate a confidence value to determine whether the results of said focus detection means have a sufficient level of confidence. The confidence value calculation device includes a plurality of confidence value calculation units with each calculation unit executing a different calculation process.

21 Claims, 10 Drawing Sheets

AUTOFOCUS ADJUSTMENT DEVICE

BACKGROUND OF THE INVENTION

1. Field of the Invention

The present invention relates to an autofocus adjustment device for a photographic camera, video camera, and the like.

2. Description of Related Art

Japanese Unexamined Patent Publication Hei 1-167815, Japanese Unexamined Patent Publication Hei 1-285908, and the like, are known in which whether the current defocus amount is acceptable for trial drive is determined, and the trial drive is prohibited if it is not acceptable.

If the focus detection area misses the main subject targeted by the photographer, the defocus amount being detected changes. The defocus amount changes similarly with the movement condition of the subject. Hence it is impossible to determine whether the currently detected defocus amount has a sufficient level of confidence based only on the change in defocus amount ignoring the movement condition of the subject.

SUMMARY OF THE INVENTION

An object of the present invention is to provide an autofocus adjustment device capable of accurately obtaining a confidence level associated with focus detection, thus overcoming the problem described above.

In order to resolve the above and other problems, the present invention, as shown in FIG. 1, includes a confidence value calculation device 99 including a plurality of confidence level calculation units 100, 101 as shown in FIG. 1. Moreover, the present invention includes a confidence value calculation method selection device 102 to select the optimum confidence level calculation method among the plurality of confidence level calculation units 100, 101. Furthermore, the present invention determines the condition of the subject, and a confidence value calculation method is selected based on the condition of the subject, for example, whether the subject is a moving body. In addition, the present invention may calculate a confidence level of the current defocus amount based on whether the image plane movement velocity ratio is within a predetermined range when the previous subject is a moving body and based on the shift amount of the past subjects from the image plane position when the previous subject was a still body.

By selecting the optimum confidence level calculation method, the present invention is capable of accurately calculating the confidence level of the current defocus amount.

DETAILED DESCRIPTION OF PREFERRED EMBODIMENTS

Figure 1:
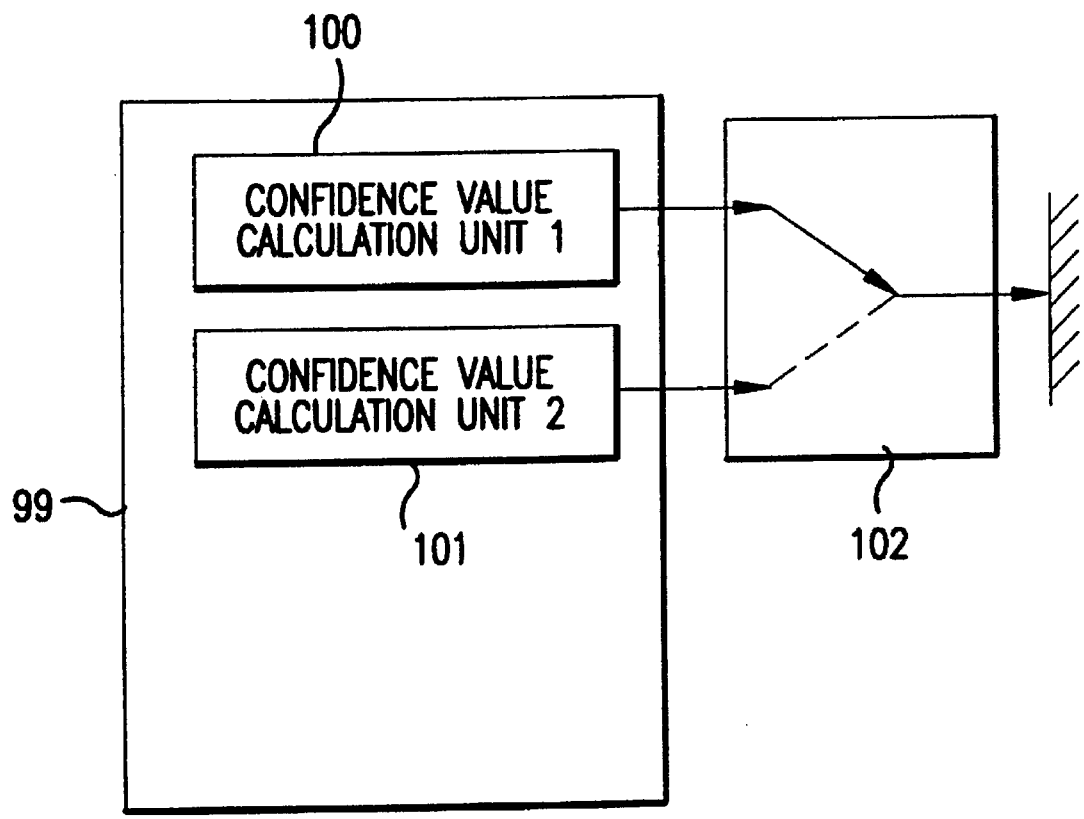
FIG. 1 is a block diagram of the basic operation of the present invention.
Figure 2:
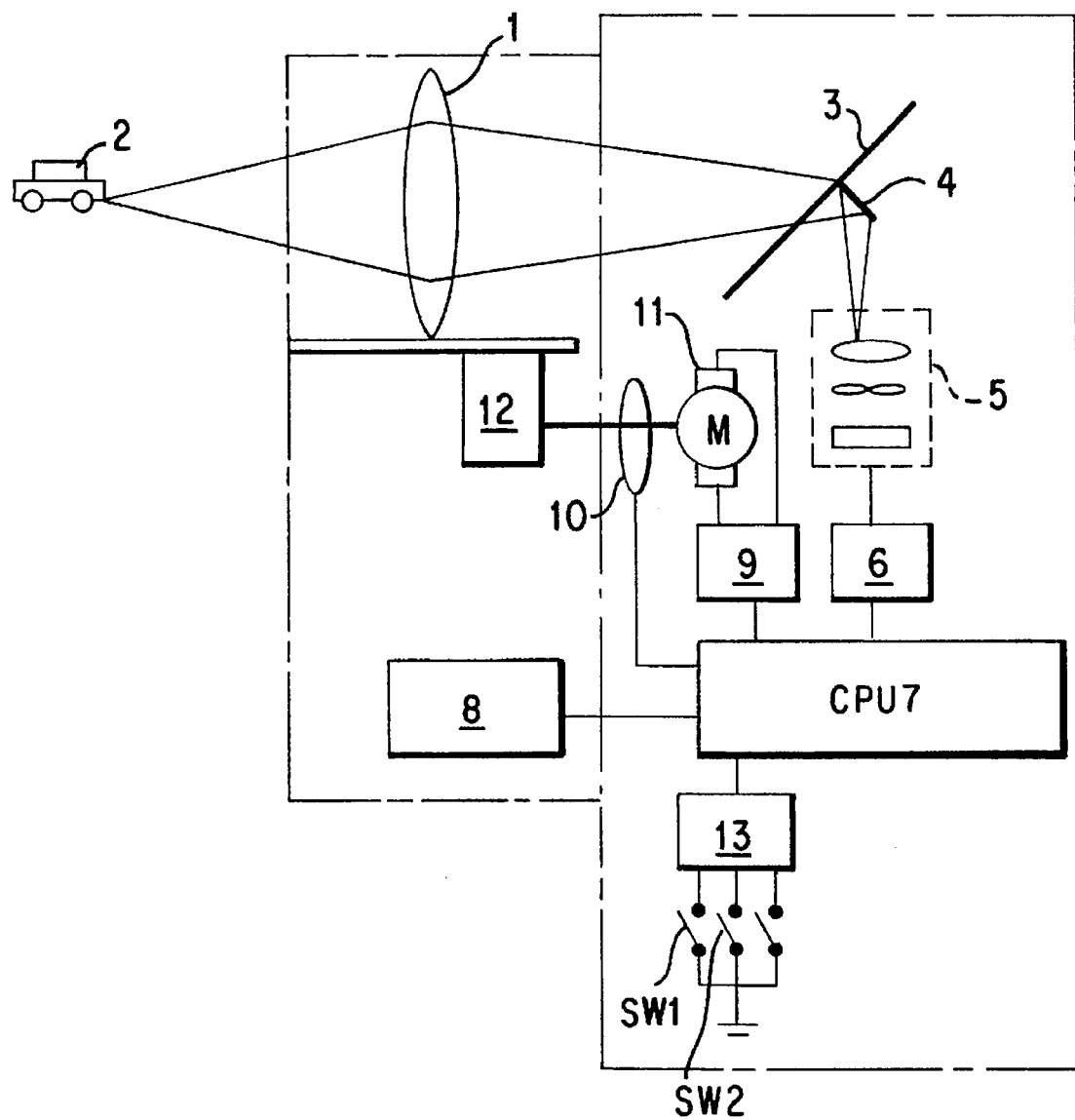
FIG. 2 is a drawing showing the structure of a camera system of an embodiment of the present invention.

FIG. 2 shows a structure of a camera system of an embodiment of the present invention. The camera system comprises a camera body and an interchangeable lens barrel. The left side of the alternate long and short dash line in FIG. 2 shows the components of the lens barrel while the right side of the same line denotes the components of the camera body.

A portion of the light rays from the subject 2 which pass through the phototaking lens 1 is guided to an AF module 5 through a main mirror 3 and a sub mirror 4 and is converted to electric signals denoting the focus adjustment condition of the phototaking lens 1. The AF module is a well known focus detection device consisting of a re-imaging optical system and a CCD sensor and is controlled by a sensor driving circuit 6.

Upon receiving photoelectric conversion signals from the AF module 5 denoting the focus adjustment condition, a CPU 7 executes A/D conversion of the photoelectric conversion signals and stores them in a memory within a CPU 7. A lens information memory circuit 8 stores information unique to the lens such as focal distance, and defocus amount/lens driving amount conversion coefficients of the phototaking lens 1. The CPU 7 obtains the defocus amount, or the focus shift amount, from the stored photoelectric signal data denoting the focus adjustment condition and computes the lens driving amount based on this defocus amount (i.e., focus coordination information) and the defocus amount/lens driving amount conversion coefficients data stored in the lens information memory circuit 8.

A motor control circuit 9 drives the phototaking lens through the motor 11 and a movement mechanism 12 based on the lens driving amount signals from the CPU 7 and controls the driving of the motor 11 by monitoring with the encoder 10 the lens movement amount or the position of the phototaking lens. As a result, the focus adjustment operation of the phototaking lens is executed.

An external operation member 13 of the camera body includes a plurality of switches. The operation member 13 includes a switch SW1 that interlocks with the release button of the camera and starts the autofocus adjustment, etc., of the phototaking lens 1 by a first stroke of the release button (hereafter half-depressed switch) and switch SW2 which starts the exposure control sequence by a second stroke of the release button (hereafter fully-depressed switch).

Figure 3:
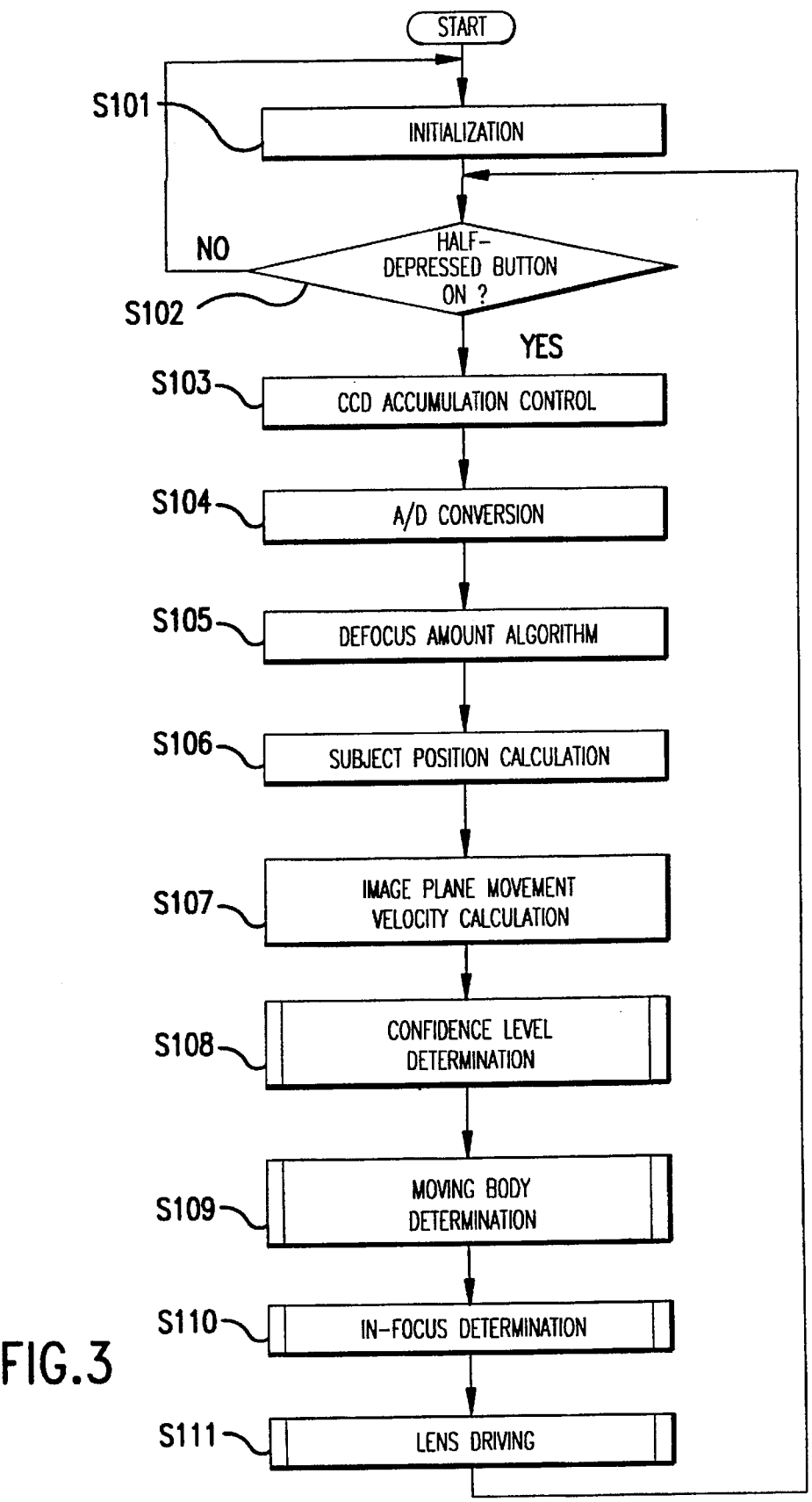
FIG. 3 is a drawing of the main flow chart of the camera of FIG. 2.

These controls are executed by software within the CPU 7. FIG. 3 is a main flow chart describing the CPU 7 in the embodiment of the present invention.

At step S101 the memories and the flags to be used are initialized. These include, for example, the previously detected defocus amount, the mid-point time of the CCD sensor accumulation time of the CCD sensor in the AF module, the movement graph (indicates that the subject is a moving body), and the focus graph (indicates that the phototaking lens is in-focus).

At step S102 the half-depressed switch SW1 is checked, and if it is "ON" the program moves to S103. Otherwise, the program returns to step S101.

At step S103 a subroutine for CCD accumulation control is executed. In the accumulation control subroutine, starting and ending of electric charge accumulation for the CCD sensor of the AF module 5 are controlled. In addition, the average lens position LP0 during accumulation for each region is calculated by a monitoring pulse from the encoder 10. In the accumulation control subroutine, in order to calculate the average lens position LP0 during accumulation in FIG. 4, the number of feedback pulses from the encoder 10 from the start to the end of accumulation is counted. In order to obtain lens information (defocus amount/lens driving amount conversion coefficients, open aperture F value, etc.) at the mid-point point T0 of accumulation time, lens communication is started at time T0. Here, the lens side sends lens information at the start of lens communication.

At step S104 an accumulation control subroutine in which A/D conversion of the analog signals photoelectrically converted by the CCD sensor in the AF module 5 is executed, and the results are stored in the memory connected to the CPU 7.

At step S105 a well known subroutine of a defocus amount algorithm is executed. Here, the defocus amount is calculated based on the photoelectric conversion signals stored in the memory.

Figure 4:
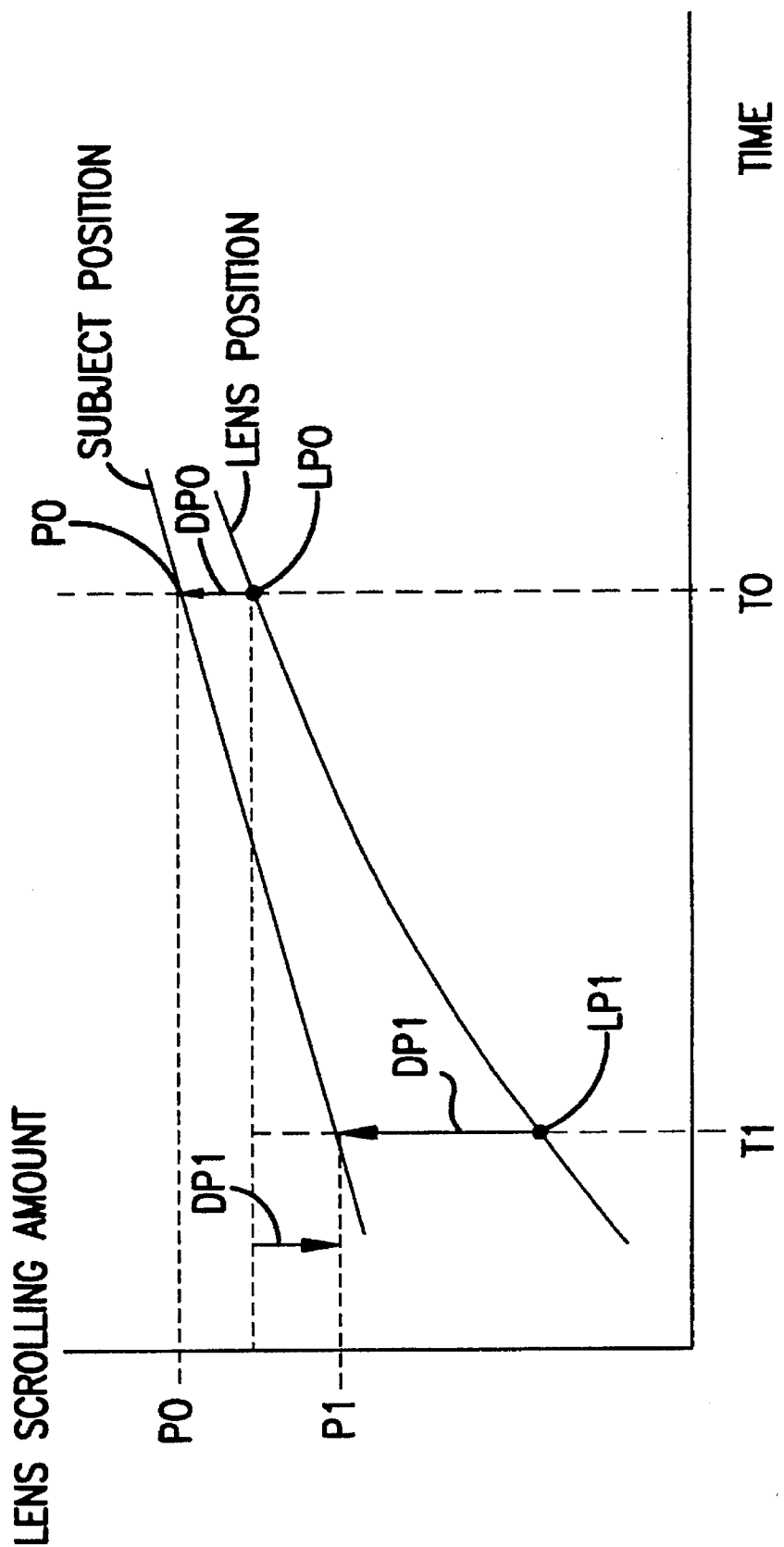
FIG. 4 is a graph of lens scrolling amount versus time for calculating the image plane movement velocity and the focus position change velocity of the camera of FIG. 2.

At step S106 the subject target position P0 is calculated. The subject target position P0 represents the position of the subject at the accumulation mid-point time T0 as shown in FIG. 4. The calculation of the subject target position P0 is performed as follows.

To begin with, the defocus amount DF0 obtained at step S105 is used to calculate the lens scrolling amount DP0 for feedback pulse conversion by the following formula (1) using the two defocus and amount/lens driving amount conversion coefficients KL and L and the lens driving/pulse conversion coefficient KB that is unique to the camera body.

$$DP0 = KB*KL*DF0/(1-L*DF0) \quad (1)$$

The defocus amount DF0 obtained by current detection is equivalent to the defocus amount at the average lens position during current accumulation. Hence the subject target position P0 is calculated by the following formula (2).

$$P0 = DP0 + LP0 \quad (2)$$

At step S107 the image plane movement velocity S0 and the focus position change velocity SP0 are calculated.

The calculated defocus amounts, subject target positions, image plane velocities, and focus position change velocities are focus detection results for use in achieving an accurate focus.

At step S108 the confidence value J0 of the currently detected focus amount is calculated. The confidence value J0 is a quantity indicating whether the current defocus amount is reliably based on past defocus amounts stored in the memory.

At step S109 the subject movement condition, that is, whether the subject is a moving body or a still body, is determined based on the current defocus amount and the past focus detection information (defocus amount, average lens position, and accumulation mid-point time) stored in the memory. The CPU 7, AF module 5, and associated memory devices act as a subject movement determination device to determine the movement condition.

At step S110 the current in-focus status is determined.

At step S111 the control amount needed to actually execute lens driving is calculated.

Hereafter, a detailed description of each subroutine will be given.

To begin with, a subroutine to calculate the image plane movement velocity at step S107 will be explained.

Calculation methods to calculate the image plane movement velocity and the focus position change velocity will be explained with reference to FIG. 4. The image plane movement velocity calculation subroutine calculates the movement velocity of the image plane produced by movement of the subject (image plane movement velocity) and the lens position change velocity (focus position change velocity) at different times (times T1 and T0), relative to a single lens position. As can be seen in FIG. 4, the values LP1 and LP0 represent the lens positions at time T1 and T0, respectively. Likewise, the values DP1 and DP0 represent the amount of lens scrolling needed to focus the lens on the subject at times T1 and T0, respectively.

The image plane movement velocity thus obtained is used for determination of the future position of the image plane of the moving body, while the focus position change velocity is used for lens movement control. The defocus amount represents the relative distance of the observed image plane of the subject from the pre-set image plane, and the change of the defocus amount with respect to phototaking lens movement is, in general, not proportional but varies with the position of the lens. Hence simple addition and subtraction of the defocus amounts at various lens positions will not provide accurate image plane movement velocities.

Therefore, in order to calculate the image plane movement velocity, the first relative value DP1' of the subject position (P1) at the previous accumulation mid-point time (T1) observed from the lens position (LP0) of the current accumulation mid-point time (T0) is calculated by the following formula (3).

$$DP1' = P1 - LP0 \quad (3)$$

where P1 denotes the previous subject target position.

Next, the relative value DP1' is used to calculate the defocus amount DF1' using the defocus amount/lens driving amount conversion coefficients obtained at the current accumulation mid-point time (T0).

$$DF1' = DP1'/(KB*KL + DP1'*L) \quad (4)$$

The image plane movement velocity S0 is obtained from the following formula (5) using the current defocus amount DF0, the defocus amount DF1' at the previous accumulation mid-point time observed from the current accumulation mid-point time, and the time interval between the two times.

$$S0 = (DF0 - DF1')/(T0 - T1) \quad (5)$$

Next, the calculation method of the focus position change velocity will be explained with reference to FIG. 4. The focus position change velocity SP0 is obtained as the displacement value of the in-focus lens position per unit of time from the following formula (6) using the lens position P1 to focus on the subject at the previous accumulation mid-point time T1, the lens position P0 to focus on the subject at the current accumulation mid-point time T0, and the time interval during those times.

$$SP0=(P0-P1)/(T0-T1) \qquad (6)$$

In the present embodiment, the current focus detection results and the previous focus detection results are used to calculate the image plane movement velocity and the focus position change velocity, but other results can be used with equal success. For example, the current results and the results from one moment before the previous focus detection can be used.

Next, a subroutine to determine the confidence level at step S108 will be explained.

Figure 5:
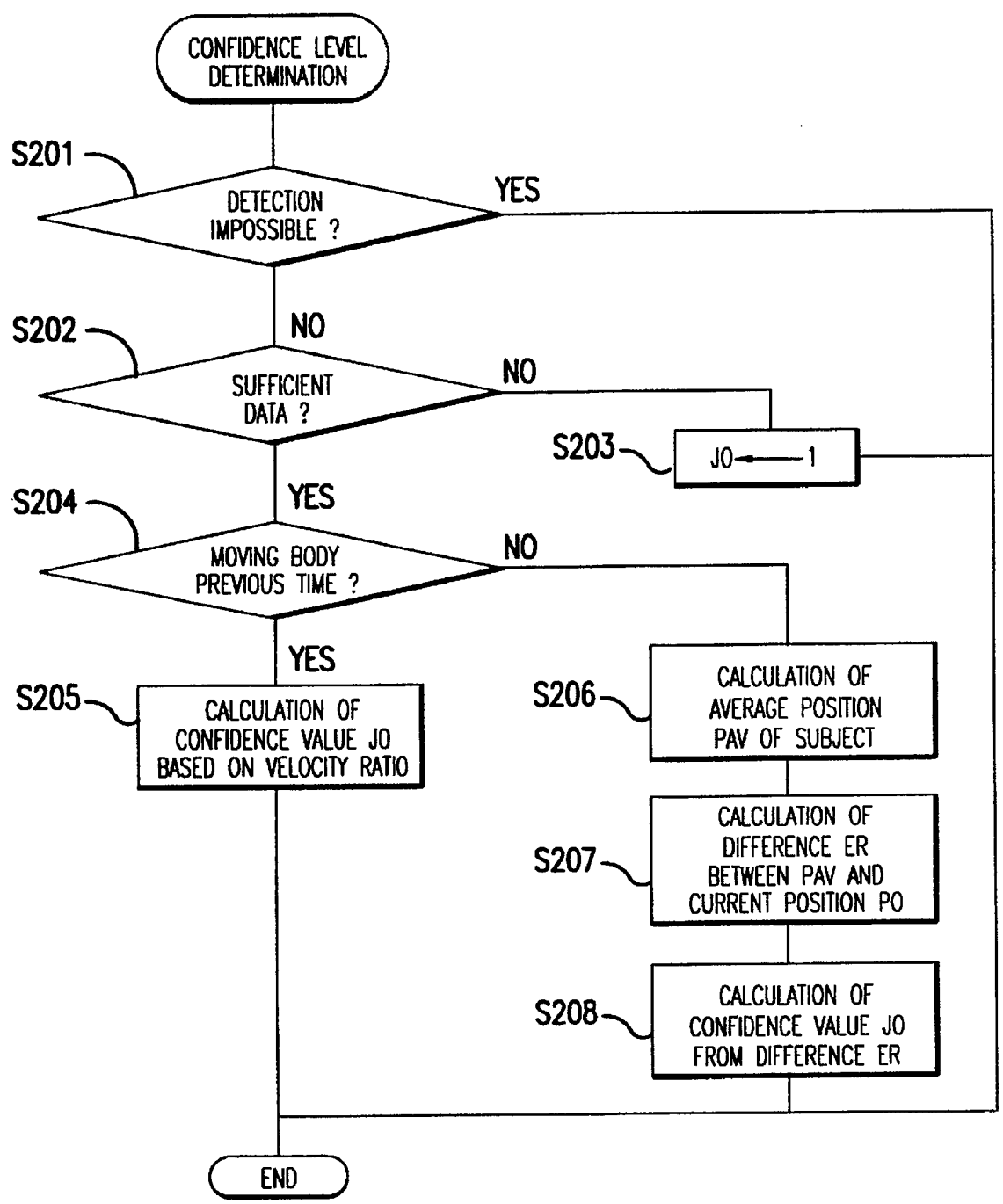
FIG. 5 is a drawing showing a flow chart for confidence level determination for the camera of FIG. 2.

FIG. 5 shows a subroutine for determination of the confidence level. At step S201 whether focus detection is currently possible is determined. If focus detection is impossible, the confidence value J0 is not computed, hence the subroutine for the confidence level determination is ended.

At step S202 whether sufficient data are available to determine the confidence level of the focus detection results is determined. If there is not sufficient data, the program, being unable to calculate a confidence value, moves to step S203 and changes the current confidence value J0 to one.

At step S204 the program tests and determines whether the subject was moving at the previous time. If the subject was moving, the program moves to step S205 to calculate the confidence value using the image plane movement velocity ratio.

If the subject was not moving, an accurate confidence value cannot be calculated due to the occurrence of a small image plane movement velocity caused by a focus detection error in calculating the confidence value based on the image plane movement velocity ratio. Therefore, in steps S206–S208, the difference ER is calculated using the average position PAV of the subject obtained from the lens scrolling amount based on the defocus amount obtained previously and the position P0 of the subject obtained from the lens scrolling amount based on the defocus amount obtained currently, and the confidence value J0 is calculated based on the difference ER.

Figure 6:
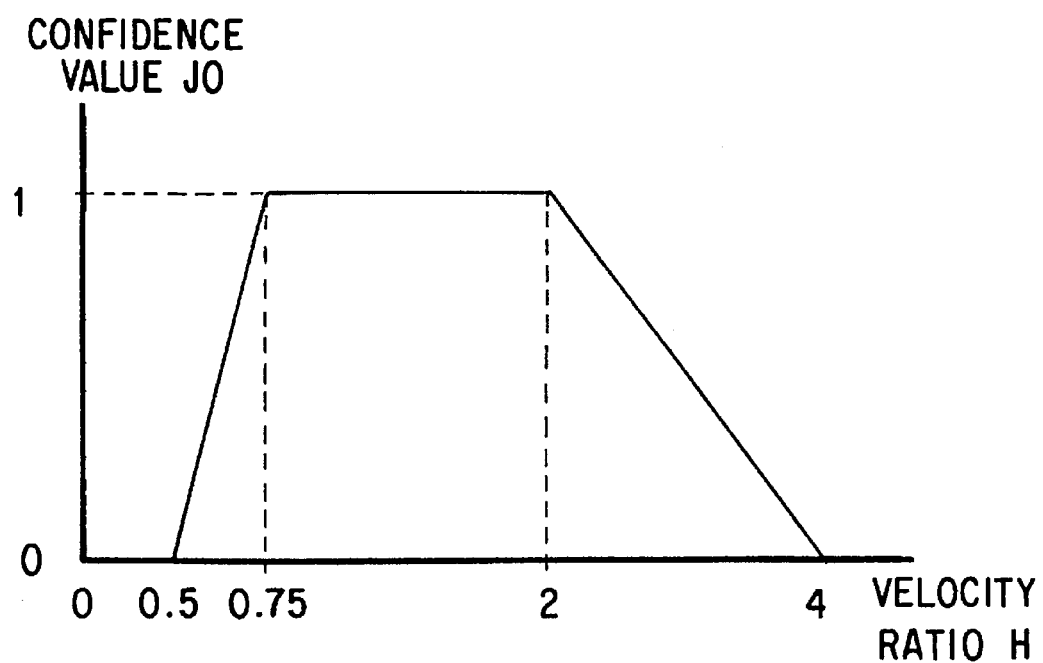
FIG. 6 is a graph showing the relationship between the confidence value and the velocity ratio for successively detected subjects for the camera of FIG. 2.

Alternatively, if the subject was a moving body, the confidence value J0 at step S205 is calculated corresponding to the image plane movement velocity ratio H as indicated in FIG. 6. The confidence value is one as long as the image plane movement velocity ratio stays between 0.75 and two, and the confidence value assumes a value between zero and one when the image plane movement velocity ratio H is between 0.5 and 0.75 or between two and four. In intervals other than these, the confidence value is zero.

If the subject detected previously and the current subject are the same, the image plane movement velocity ratio is set to one provided that the change in acceleration is small. Moreover, even if the acceleration of the subject changes substantially, if not much time has elapsed after the previous detection of the image plane movement velocity, the velocity ratio H is in the interval 0.75 to 2 centering around one. By checking the image plane movement velocity ratio H, it becomes possible to detect such conditions as subject jump or moving out of the focus detection area.

At step S206 the average position PAV based on subject position data obtained from the lens scrolling amount based on the previously obtained defocus amount is calculated from the following formula (7).

$$PAV=(P1+P2+P3+\ldots+P6)/6 \qquad (7)$$

Figure 7:
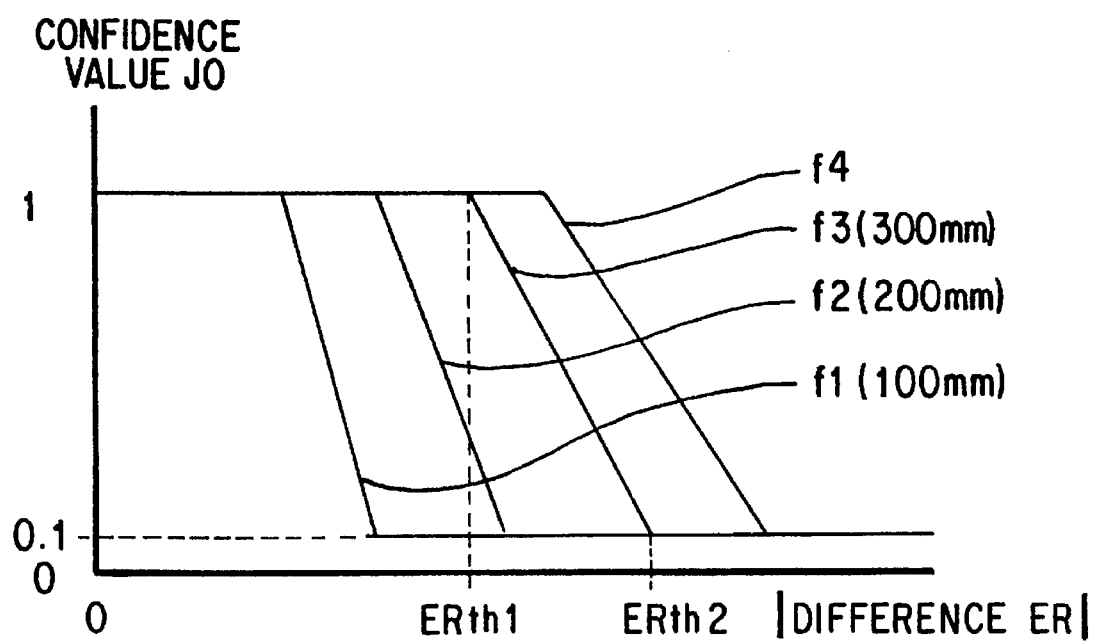
FIG. 7 is a graph of confidence levels versus differences in average subject positions for phototaking lenses of different focal lengths for the camera of FIG. 2.

This formula applies to a situation in which the number of data is six. Here, an average of the totality of data is computed as the average position PAV, but an average of 2 or 3 data from the latest data can be used equally well. At step 207 the difference ER of the average position PAV from the current subject target position P0 is computed. At step S208 the confidence value J0 is computed based on the difference ER as indicated in FIG. 7.

Here, the confidence value J0 depends on the difference ER and the focal distance f of the shooting lens. The reason that the confidence value J0 depends on the focal distance is that in comparing a lens with a long focal distance and a lens with a short focal distance, the lens with the long focal distance has a larger change in the subject target position assuming that the phototaking distance of the phototaking lens changes the same amount.

The confidence value J0 is one when the deviation ER is between 0 and ERth1, between zero and one when the deviation ER is between ERth1, and ERth2, and 0.1 when the deviation is greater than or equal to ERth1. If a condition continues in which the confidence value falls below the predetermined value Jth1, then the confidence value does not equal zero even if the deviation ER is greater than or equal to ERth2. This is because the stored previous defocus amount needs to be cleared if the photographer intentionally changes the subject. The predetermined values Erth1 and ERth2 are tabulated below.

TABLE 1

|  | f1<br>f < 150 mm | f2<br>150 ≦ f < 250 | f3<br>250 ≦ f < 350 | f4<br>350 mm < f |
| --- | --- | --- | --- | --- |
| ERth1 | 5 mm | 7.5 mm | 10 mm | 12.5 mm |
| ERth2 | 8 mm | 10.5 mm | 13 mm | 15.5 mm |

Next, a subroutine for determining a moving body at step S109 will be explained.

Figure 8:
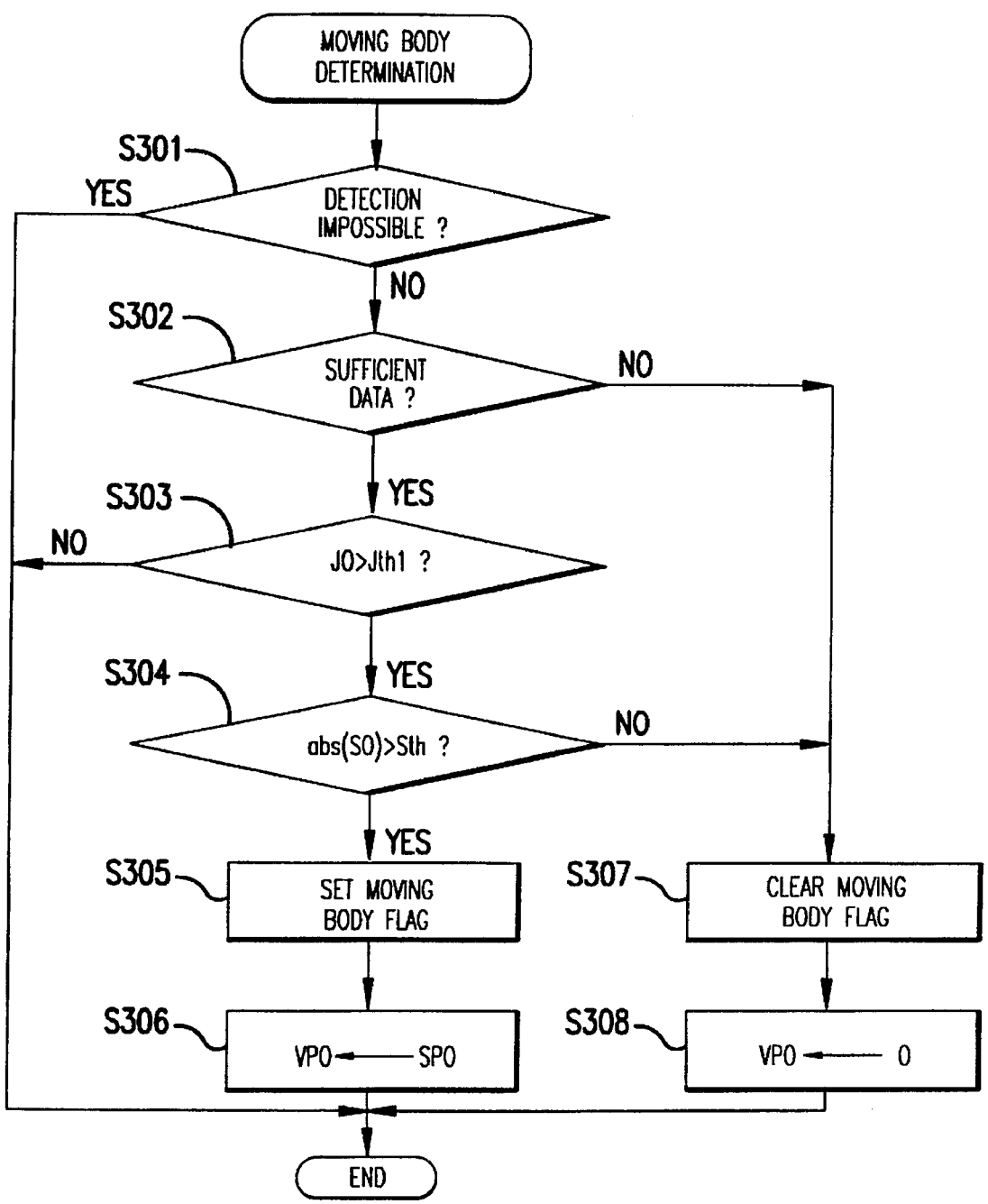
FIG. 8 is a drawing of a flow chart for moving body determination for the camera of FIG. 2.

FIG. 8 shows a subroutine flow chart for determining a moving body. At step S301 whether the current focus detection is possible is determined. If detection is impossible, the previous condition is maintained and the subroutine for determining a moving body ends.

At step S302 whether the number of subject position data obtained from the lens scrolling amount based on past defocus amounts is sufficient for determining a moving body is determined. If there is sufficient data, the program moves to step S303 to determine if the subject is a moving body. If sufficient data is not stored, the program moves to step S307 to clear the moving body flag in order to treat the current subject as a still body.

At step S303 whether the current confidence value J0 is greater than the predetermined value Jth1 is determined, and if it is the program proceeds further with the moving body determination process since the current defocus amount has a sufficient level of confidence if the current confidence value J0 is larger. If the current confidence value J0 is smaller than the predetermined value Jth1, the current defocus amount lacks a sufficient confidence level. Hence the program terminates the moving body determination subroutine in order to maintain the previous conditions.

At step S304 whether the image plane movement velocity S0 is larger than or equal to the predetermined value Sth is determined. If it is equal to or larger than Sth, the subject can be considered moving; hence, the program moves to step S305 to set the moving body flag. At step S305 the moving body flag is set so that the current subject is treated as a moving body.

At step S306 the lens movement velocity is controlled by the in-focus position change velocity SP0 in order to track the change of the in-focus position caused by movement of the subject.

At step S307 the moving body flag is cleared so that the subject is treated as a still body. At step S308 the lens movement velocity VP0 is set to 0 because the subject is a still body and there is no change of the in-focus position due to time.

Next, the in-focus determination subroutine at step S110 will be explained.

Figure 9:
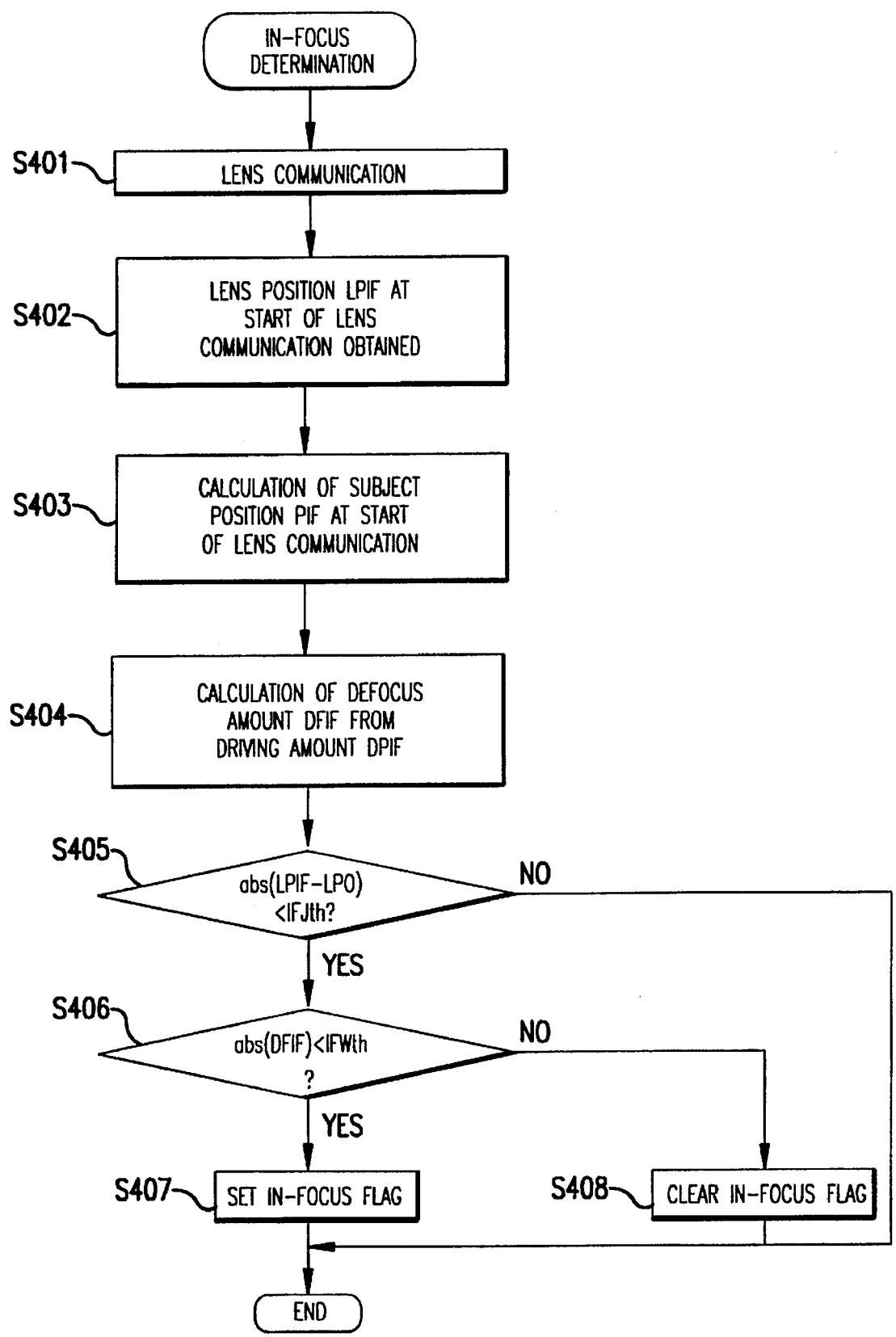
FIG. 9 is a drawing of a flow chart for in-focus determination for the camera of FIG. 2.
Figure 10:
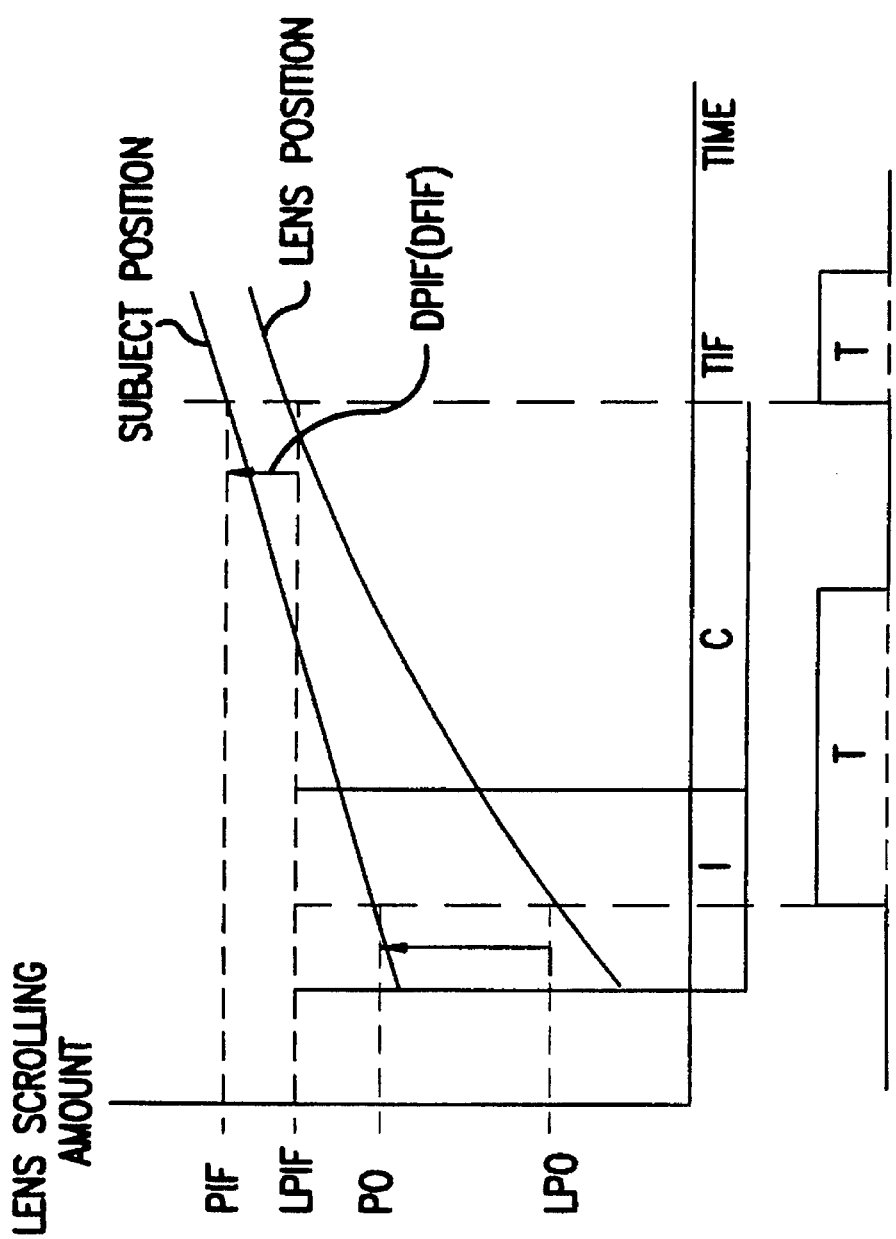
FIG. 10 is a graph of lens scrolling amount versus time for in-focus determination for the camera of FIG. 2.

FIG. 9 shows a flow chart for the in-focus determination subroutine. FIG. 10 is a graph of lens scrolling amount versus time for calculating the defocus amount DFIF to be used for the in-focus determination. In FIG. 10, the symbol "T" in the line denoted by lens communication indicates the period of time during which data is exchanged between the body lenses by lens communication. The symbol "T" denotes the accumulation time of the CCD sensor (photoelectric conversion element), and "C" denotes the focus detection algorithm time.

At step S401 the defocus amount/lens driving amount conversion coefficients to be used in the calculation of the defocus amount for the in-focus determination is obtained through lens communication. This is because the defocus amount/lens driving amount conversion coefficients change substantially with the lens position.

At step S402 the lens position LPIF at the start of lens communication is obtained, and the defocus amount DFIF (defocus amount at the start of lens communication) for the in-focus determination is computed. An encoder or the like monitors the absolute position of the phototaking lens; hence the lens position LPIF can be obtained from the monitor signals from the encoder.

At step S403 the subject position PIF at the start of lens communication is calculated from the following formula (8).

$$PIF=VPO* (TIF-T0)+P0 \tag{8}$$

where TIF denotes the starting time of lens communication.

At step S404 the remaining driving amount DPIF at the time of the in-focus determination is calculated by the following formula (9).

$$DPIF=PIF-LPIF \tag{9}$$

The defocus amount DFIF at the time of the in-focus determination is calculated from the formula (10) below based on the remaining driving amount DPIF at the start of lens communication and the defocus amount/lens driving amount conversion coefficients obtained by lens communication at step S401.

$$DFIF-DPIF/(KB*KL+DPIF*L) \tag{10}$$

At step S405 whether the lens movement amount from the current accumulation mid-point time to the in-focus determination time is less than the predetermined value IFJth is determined. This is done to avoid execution of the current in-focus determination if the lens movement amount is larger than the predetermined value since the in-focus determination is often executed erroneously due to computation errors when the lens movement amount is large.

At step S406 whether the defocus amount DFIF during the in-focus determination is within the in-focus width IFWth is determined, and if affirmative the program moves to step S407 to reset the in-focus flag. Otherwise the program moves to step S408 to clear the in-focus flag.

Figure 11:
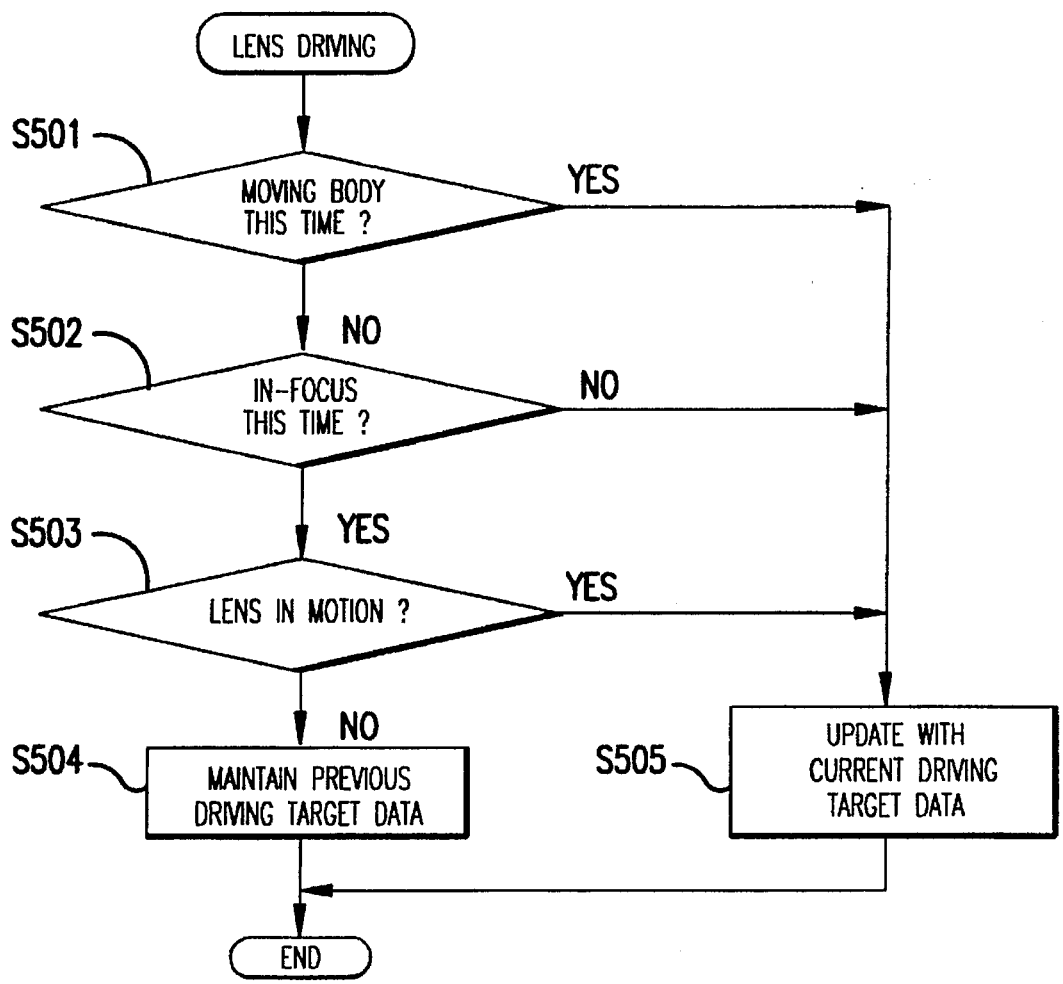
FIG. 11 is a drawing of flow chart for lens driving of the camera of FIG. 2.

Next, a subroutine for lens driving at step S111 will be explained with reference to FIG. 11. At step S501 in FIG. 11 (step S109 on FIG. 3), whether the current subject is a moving body is determined by the moving body flag. If a moving body is determined, the in-focus determination routine will not stop lens driving at step S110; hence, the data are updated to the drive target data calculated for this time at step S505. Here, the driving target data are the subject position P0 at the accumulation mid-point time calculated at the current time and the lens movement target velocity VP0 at that time.

Step S502 is executed if the current subject is not determined to be a moving body by the moving body determination routine in step S109. Moreover, if it is not determined by the in-focus determination routine at this time at step S110 that the in-focus condition is obtained, the data are replaced at step S505 by the driving target data calculated at this time. If it is determined to be in focus, the program moves to step S503.

At step S503 whether the phototaking lens is currently moving is determined, and if it is moving the data are replaced at step S505 by the driving target data calculated at this time. If the phototaking lens is currently being driven, the phototaking lens is not stopped immediately after entering the in-focus range but is driven until the phototaking lens reaches the position where the defocus amount is 0.

If a lens is not being driven at this time, the process advances to step 504. In step 504, the last lens driving target data is maintained, thus no update occurs.

In the previous embodiment, a confidence value calculation method was selected based on whether the previous subject was a moving body or a still body. In contrast, a second embodiment is designed to calculate a confidence value using the same method for a moving body and a still body if the image plane movement velocity is slow. Thus, in the second embodiment, a confidence value calculation method is selected based on whether the previous image plane velocity is within the predetermined value range rather than on whether the subject is a moving body or a still body.

Figure 12:
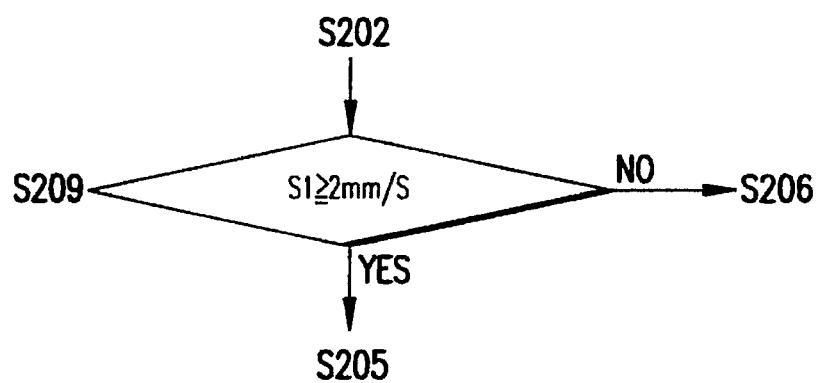
FIG. 12 is a flow chart showing a confidence level determination step of a second embodiment of the present invention.

The second embodiment differs only at step S204 in the flow chart to determine the confidence level in FIG. 5; hence only that step as revised is shown in FIG. 12. As shown in FIG. 12, in new step S209, the process advances to step 205 when a last subject image plane movement speed is 2 mm/sec or more. The process advances to step 206 when the last subject image plane movement speed is less than 2 mm/sec.

In the second embodiment, a confidence value of a subject moving with an image plane movement velocity slower than 2 mm/s is obtained based on the deviation from the average position of the subject target positions obtained previously. In this case, the subject is actually a moving body; hence, this deviation may change substantially depending on the subject target position data used to obtain the above-stated average position. Therefore, the data used to obtain the above-stated average position need to include one or two subject target position data taken as close to the current time as possible.

The present invention is capable of calculating a confidence level of the current defocus amount accurately because it selects at least one of the plurality of confidence level computation methods.

The present invention is capable of selecting a confidence level calculation method matching the movement condition of the subject and of calculating the confidence level of the current defocus amount accurately because it selects at least one of the plurality of confidence level computation methods corresponding to the results of using the subject condition determination device to determine the condition of the subject.

The present invention is capable of determining the confidence level of the current defocus amount accurately since it determines the confidence level of the current defocus amount based on the ratio of the image plane movement velocity of the subject when it is a moving body and on the shift amount from the average position when it is a still body.

In the illustrated embodiments, autofocus adjustment has been described in terms of a CPU 7 and associated memories and input and output as a controller for control according to the various flowcharts. However, such a controller may be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PALs or the like). The controller can also be implemented using a suitably programmed general purpose computer, e.g., a microprocessor, microcontroller or other processor device (CPU as described previously or MPU), either alone or in conjunction with one or more peripheral (e.g., integrated circuit) data and signal processing devices. In general, any device or assembly of devices on which a finite state machine capable of implementing the flowcharts shown in FIGS. 3, 5, 8, 9, 11 and 12 can be used as the controller. A distributed processing architecture is preferred for maximum data/signal processing capability and speed.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. An autofocus adjustment device for an optical device including a phototaking lens, said device comprising:
   a focus detection device to determine focus detection results for said phototaking lens; and
   a confidence value calculation device to calculate a confidence value associated with said focus detection results to determine whether said confidence value exceeds a predetermined value, wherein said confidence value calculation device includes a plurality of confidence value calculation units, each confidence value calculation unit calculating a separate confidence value by a separate calculation method, wherein each of the confidence values is indicative of a subject condition, and wherein each of the confidence values is based on previous and present focus detection results.

2. An autofocus adjustment device according to claim 1, further comprising a selection device to select a confidence value calculated by at least one of said plurality of confidence value calculation units as said associated confidence value.

3. An autofocus adjustment device according to claim 2, further comprising a subject condition determination device to determine the condition of a subject, wherein said selection device selects said associated confidence value based on said subject condition determined by said subject condition determination device.

4. An autofocus adjustment device according to claim 3, wherein said subject condition determination device includes a moving body determination device to determine the movement of a subject.

5. An autofocus adjustment device according to claim 3, wherein at least one of said plurality of confidence value calculation units determines a confidence value based on a ratio of image plane movement velocities of an image plane of said phototaking lens and at least one of said plurality of confidence value calculation units determines a confidence value based on the difference between an image plane position and the average of a plurality of image plane positions.

6. An autofocus adjustment device according to claim 1, wherein at least one of said plurality of confidence value calculation units determines a confidence value based on whether a ratio of image plane movement velocities of image planes of a previously moving subject formed by said phototaking lens is within a predetermined range and at least one of said plurality of confidence value calculation units determines a confidence value based on a difference in image plane positions of a still subject formed by said phototaking lens.

7. An autofocus adjustment device according to claim 1, further comprising a control device to execute autofocus adjustment control of said phototaking lens based on focus detection signals from said focus detection device, wherein said control device determines whether to execute said autofocus adjustment control based on the confidence value obtained by said confidence value calculation device.

8. An autofocus adjustment device for an optical device including a phototaking lens, said device comprising:
   focus detection means for determining focus detection results for said phototaking lens; and
   confidence value calculation means for calculating a confidence value associated with said focus detection results to determine whether said confidence value exceeds a predetermined value, wherein said confidence value calculation means includes a plurality of confidence value calculation units, each confidence value calculation unit calculating a separate confidence value by a separate calculation method, wherein each of the confidence values is indicative of a subject condition, and wherein each of the confidence values is based on previous and present focus detection results.

9. The autofocus adjustment device according to claim 8, further comprising selection means for selecting a confidence value calculated by at least one of said plurality of confidence value calculation units as said associated confidence value.

10. The autofocus adjustment device according to claim 9, further comprising subject condition determination means for determining the condition of a subject, wherein said selection means selects said associated confidence value based on said subject condition determined by said subject condition determination means.

11. The autofocus adjustment device according to claim 10, wherein said subject condition determination means includes a moving body determination means for determining the movement of a subject.

12. The autofocus adjustment device according to claim 11, wherein at least one of said plurality of confidence value calculation units determines a confidence value based on a ratio of image plane movement velocities of an image plane of said phototaking lens and at least one of said plurality of confidence value calculation units determines a confidence value based on the difference between an image plane position and the average of a plurality of image plane positions.

13. The autofocus adjustment device according to claim 8, wherein at least one of said plurality of confidence value calculation units determines a confidence value based on whether a ratio of image plane movement velocities of image planes of a previously moving subject formed by said phototaking lens is within a predetermined range and at least one of said plurality of confidence value calculation units determines a confidence value based on a difference in image plane positions of a still subject formed by said phototaking lens.

14. The autofocus adjustment device according to claim 8, further comprising control means for executing autofocus adjustment control of said phototaking lens based on focus detection signals from said focus detection means, wherein said control means determines whether to execute said autofocus adjustment control based on said associated confidence value.

15. A method of determining the confidence level of focus detection results for autofocus adjustment of an optical device including a phototaking lens, comprising the steps of:

determining focus detection results for said phototaking lens;

calculating a first confidence value using a first calculating method based on said focus detection results;

calculating a second confidence value using a second calculation method based on said focus detection results; and determining whether a confidence value associated with said focus detection results exceeds a predetermined value.

16. The method of claim 15, further comprising the step of selecting either said first or second confidence value as said associated confidence value for said determining step.

17. The method of claim 16, further comprising the step of determining the condition of a subject, wherein said selecting step selects said associated confidence value based on the determined condition of said subject.

18. The method of claim 17, wherein said step of determining the condition of a subject comprises the step of determining the movement of said subject.

19. The method of claim 17, wherein said step of calculating a first confidence value comprises the step of calculating a confidence value based on a ratio of image plane movement velocities of an image plane of said phototaking lens and said step of calculating a second confidence value comprises the step of calculating a confidence value based on the difference between an image plane position and the average of a plurality of image plane positions.

20. The method of claim 15, further comprising the step of determining whether a ratio of image plane movement velocities of image planes of a previously moving subject formed by said phototaking lens is within a predetermined range, wherein said step of calculating a first confidence value calculates said first confidence value based on a difference in image plane positions of a still subject formed by said phototaking lens.

21. The method of claim 15, further comprising the step of executing autofocus adjustment control of said phototaking lens based on said associated confidence value exceeding said predetermined value.

* * * * *